United States Patent

Stieff

[11] Patent Number: 5,870,835
[45] Date of Patent: Feb. 16, 1999

[54] AUTOMOTIVE MEASURING GAUGE

[75] Inventor: Michael T. Stieff, Wentville, Mo.

[73] Assignee: Hunter Engineering Company, Bridgeton, Mo.

[21] Appl. No.: 877,356

[22] Filed: Jun. 17, 1997

[51] Int. Cl.$^6$ ............................. G01B 5/00; G01B 5/18; G01B 5/02
[52] U.S. Cl. .......................... 33/600; 33/203.11; 33/832; 33/836
[58] Field of Search ............................. 33/600, 609, 203, 33/203.11, 812, 813, 817, 832, 833, 836, 559, 561; 116/272, 285

[56] References Cited

U.S. PATENT DOCUMENTS

| | | | |
|---|---|---|---|
| 1,241,161 | 9/1917 | Starrett | 33/817 |
| 3,269,019 | 8/1966 | Krohn | 33/203.11 |
| 3,721,010 | 3/1973 | Ristow | 116/285 |
| 5,333,342 | 8/1994 | Huang | 33/203.11 |
| 5,369,602 | 11/1994 | Naas et al. | 33/600 |

FOREIGN PATENT DOCUMENTS

| | | | |
|---|---|---|---|
| 750251 | 7/1980 | U.S.S.R. | 33/203.11 |
| 1211575 | 11/1970 | United Kingdom | 33/203.11 |

Primary Examiner—G. Bradley Bennett
Attorney, Agent, or Firm—Polster, Lieder, Woodruff & Lucchesi

[57] ABSTRACT

A measuring gauge intended for use in conjunction with an automotive vehicle alignment system is disclosed to measure and record various measurements associated with automotive maintenance such as tire tread depth, tire pressure, and brake rotor thickness. The measuring gauge comprises a spring loaded plunger axially mounted within a cylindrical body or housing. Extending beyond the housing, one end of the plunger is adapted to linearly engage surface being measured. The opposite end, also extending beyond the housing, is adapted for insertion with a sensor port on an alignment system, and includes a series of annular grooves adapted to drive a rotary encoding sensor within the port. During use, the contact end of the plunger is depressed by the surface undergoing measurement, and the insertion end proportionally extended, revealing a number of the annular grooves. An internal lock secures the plunger in the depressed position upon removal of the gauge from the surface undergoing measurement. Insertion of the insertion end of the gauge within the sensor port engages the rotary encoder sensor with the annular groove. Releasing the locking mechanism causes the spring loaded plunger to return to its original extended position. The rotary encoder sensor detects this displacement and the associated measurement is recorded.

29 Claims, 4 Drawing Sheets

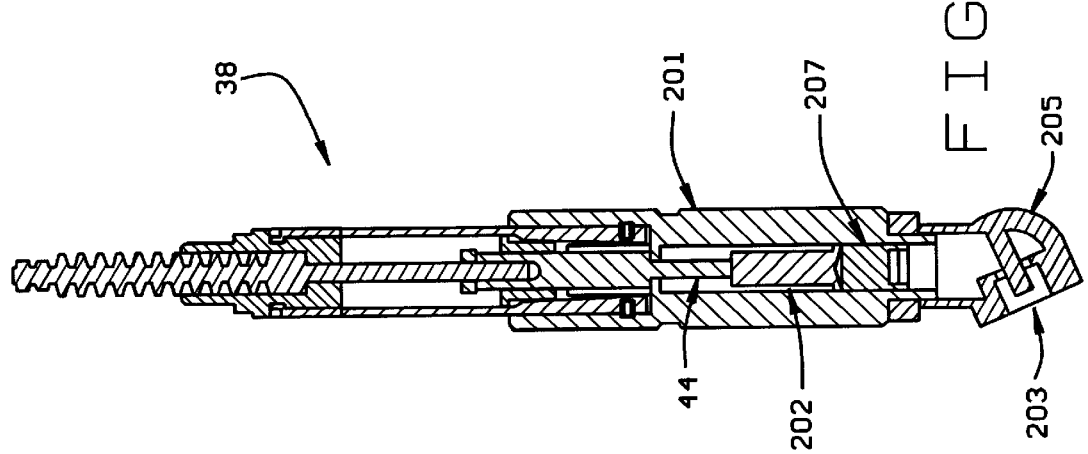
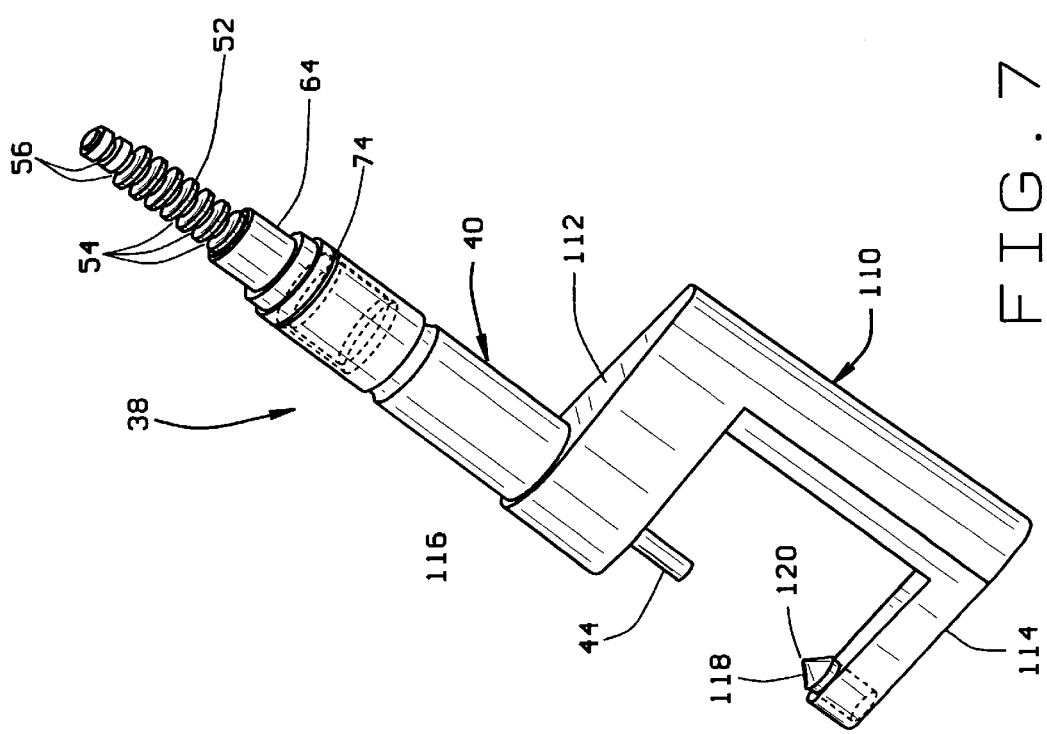

AUTOMOTIVE MEASURING GAUGE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

This invention relates to devices designed to facilitate measurements commonly associated with automotive applications, and more specifically, to a device associated with an automotive wheel alignment system for measuring and recording measurements specific to each wheel on a vehicle.

During automotive maintenance, it is often necessary to record numerous measurements of the various vehicle components to determine if a part is worn or in need of replacement. This is particularly applicable to vehicle components associated with the wheels and brakes. Since most vehicle have several wheels, there is a degree of repetition associated with taking and recording such measurements. Oftentimes, measurements of tire tread depth, tire pressure, and brake rotor thickness are recorded by hand, and later entered into a computer system along with identification means indicating at which wheel they were recorded. Commonly, these types of measurements are taken when a vehicle is positioned on an wheel alignment rack or system which provides alignment sensors at each wheel position.

Accordingly, the present invention discloses a multi-purpose measuring gauge adapted for use in conjunction with an automotive alignment system, such that measurements taken at an individual wheel may be entered into the alignment system computer by means of a sensor or port associated with the wheel alignment and ride height sensor for each particular wheel. The invention, which will be described in detail hereinafter, in one embodiment is designed to operate in conjunction with automotive systems and sensors for measuring vehicle alignment which have been adapted with additional sensor ports as taught by U.S. Pat. No. 5,369,602 to Naas et al., the disclosure of which are incorporated herein by reference.

BRIEF SUMMARY OF THE INVENTION

Among the several objects and advantages of the present invention may be noted the provision of a new and improved measuring gauge for facilitating measurements associated with automotive maintenance;

The provision of the aforementioned measuring gauge in which the measuring gauge is adapted for operation in conjunction with an automotive vehicle alignment system;

The provision of the aforementioned measuring gauge which is adapted for use with vehicle sensor ports on a vehicle alignment system;

The provision of the aforementioned measuring gauge which employs a spring-loaded plunger to record measurements;

The provision of the aforementioned measuring gauge which stores recorded measurements until reset;

The provision of the aforementioned measuring gauge which substantially eliminates human error in the measuring process;

The provision of the aforementioned measuring gauge in which the measuring gauge is adapted to measure tire tread depth;

The provision of the aforementioned measuring gauge in which the measuring gauge is adapted to measure tire inflation pressure; and The provision of the aforementioned measuring gauge in which the measuring gauge is adapted to measure brake rotor thickness.

Briefly stated, the measuring gauge of the present invention is intended for use in conjunction with a automotive vehicle alignment system, to measure and record various measurements associated with automotive vehicle maintenance. The measuring gauge comprises a spring loaded plunger axially mounted within a cylindrical body or housing. Extending beyond the housing, one end of the plunger is adapted to linearly contact the surfaces being measured. The opposite end, also extending beyond the housing is adapted for insertion within an alignment system sensor port, and includes a series of annular grooves. During use, the contact end of the plunger is depressed by the surface undergoing measurement, and the insertion end proportionally extended, revealing a number of the annular grooves. A locking means comprising either a plurality of wedge-shaped collets or balls operating on a wedge-shaped (tapered) bearing is provided internal to the housing, the locking means securing the plunger in the depressed position when the gauge is removed from the surface undergoing measurement.

Upon obtaining a measurement, the measuring gauge is seated, insertion end first, within a sensor port on the associated vehicle alignment system. The locking means is released, and the plunger allowed to return to its normal, spring-loaded position. As the plunger retracts, the annular rings on the insertion end engage a rotary encoder contained within the sensor port, recording the linear motion representative of the extent of the contact end depression.

When configured as a tire tread depth gauge, the measuring gauge of the present invention provides a contact end for the plunger of sufficient length to measure the maximum tread depth associated with automobile tires. The gauge is then positioned such that the contact end is in contact with the deepest portion of a tire tread. Next, the housing is then pushed forward until it contacts the outer surface of the tire tread, thereby establishing the plunger depth as the equivalent of the tire tread depth. Finally, the tool is transferred to the particular sensor port on the alignment system associated with the measured tire, and the plunger travel measured and recorded. Since the vehicle alignment system incorporates a sensor port with each tire for alignment purposes, the probability of human error resulting from errors in associating tires with measurements is eliminated.

Similarly, the device may be configured as a tire pressure gauge, or a brake rotor thickness gauge. In the tire pressure gauge configuration, the plunger travel is proportional to the air pressure of the measured tire, allowing readings for each tire on a vehicle to be entered into the vehicle alignment system through the associated sensor ports. When configured as a brake rotor thickness gauge, the measuring gauge is affixed within a caliper, providing a fixed reference point against which the plunger travel and the corresponding brake rotor thickness may be gauged.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the drawings.

FIG. 7 is an illustration of the measuring gauge of the present invention configured to measure brake rotor thickness;

FIG. 8 is an illustration of the measuring gauge of the present invention configured to measure tire pressure.

Corresponding reference characters indicate corresponding parts throughout the several views of the drawings.

DETAILED DESCRIPTION OF THE INVENTION

The following detailed description illustrates the invention by way of example and not by way of limitation. The description will clearly enable one skilled in the art to make and use the invention, describes several embodiments, adaptations, variations, alternatives, and uses of the invention, including what we presently believe is the best mode of carrying out the invention.

Figure 1:
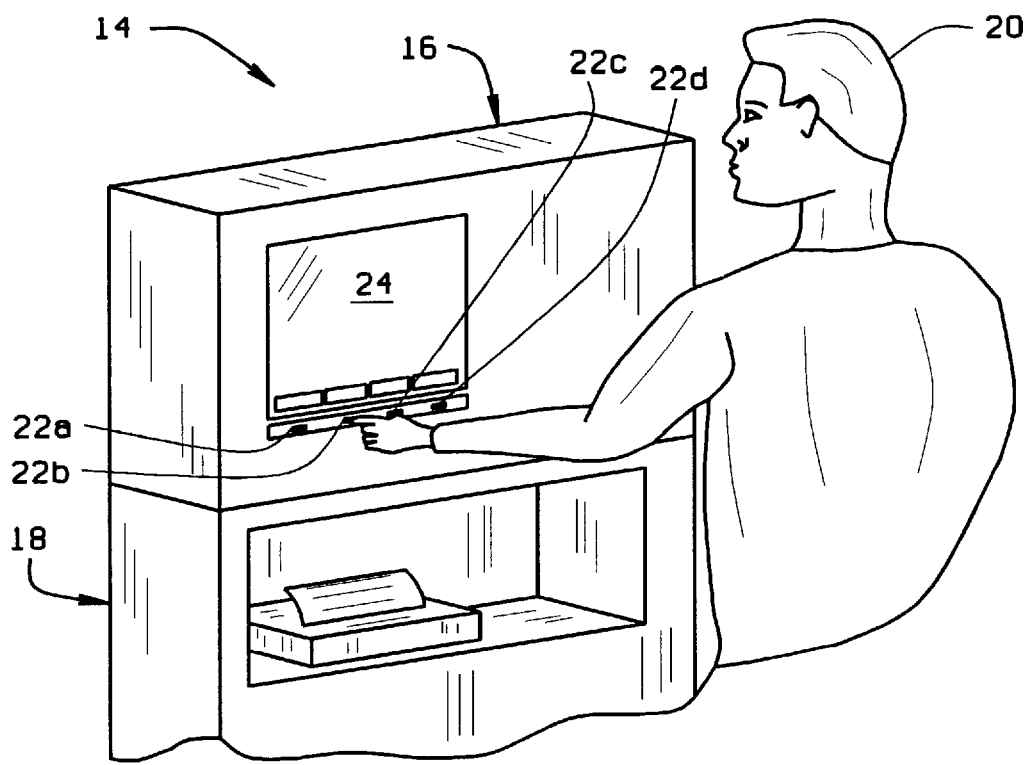
FIG. 1 is an illustration of a typical vehicle alignment system console.
Figure 2:
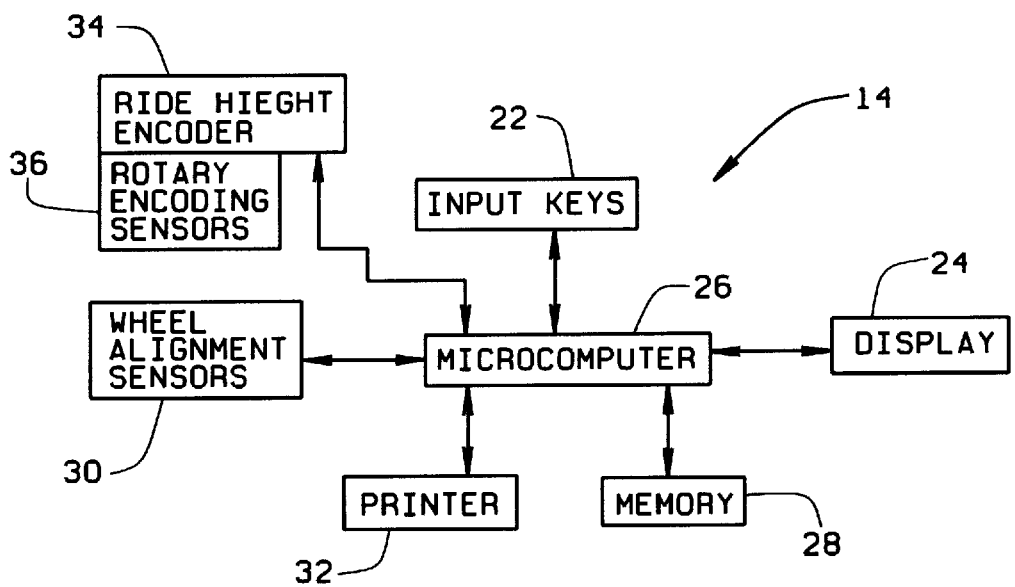
FIG. 2 is a block diagram identifying the components of the typical vehicle alignment system.

Referring now to the drawings, and FIGS. 1 and 2 in particular, there is shown a vehicle wheel alignment system 14 for use with the measuring gauge apparatus of the present invention. Alignment system 14 includes a console 16 suitably mounted on a stand 18 for use by a technician/user 20. Console 16 includes a set of manually operable input keys or switches 22a–d and a display 24.

Input keys 22 and display 24 are connected to a microcomputer 26 which functions as an electronic controller to control the operation of system 14. Any number of different microcomputers may be used in system 14, depending upon the other requirements of the system. Microcomputer 26 is shown in FIG. 2. connected to a digital memory 28, wheel alignment sensors 30, and a printer 32. It should be understood that memory 28 could be internal to the microcomputer 26, depending upon the particular microcomputer used. A ride height encoder 34 of the type disclosed in U.S. Pat. No. 5,369,602 to Naas et al. is operatively connected to the system 14, including rotary encoding sensors 36. In addition, other peripheral devices (not shown) could be connected to the microcomputer 26 as desired.

Figure 4:
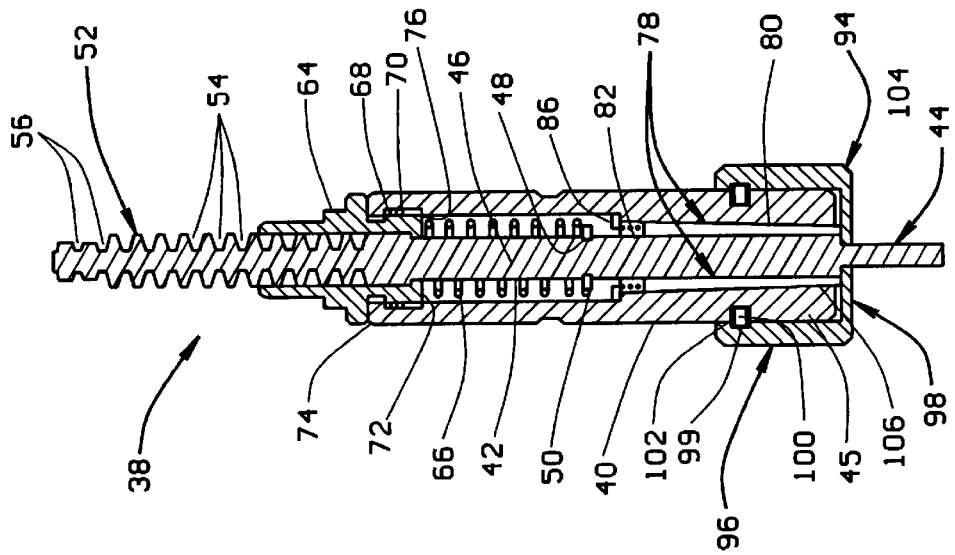
FIG. 4 is a cross sectional view of the measuring gauge shown in FIG. 3, taken along line 4—4.
Figure 3:
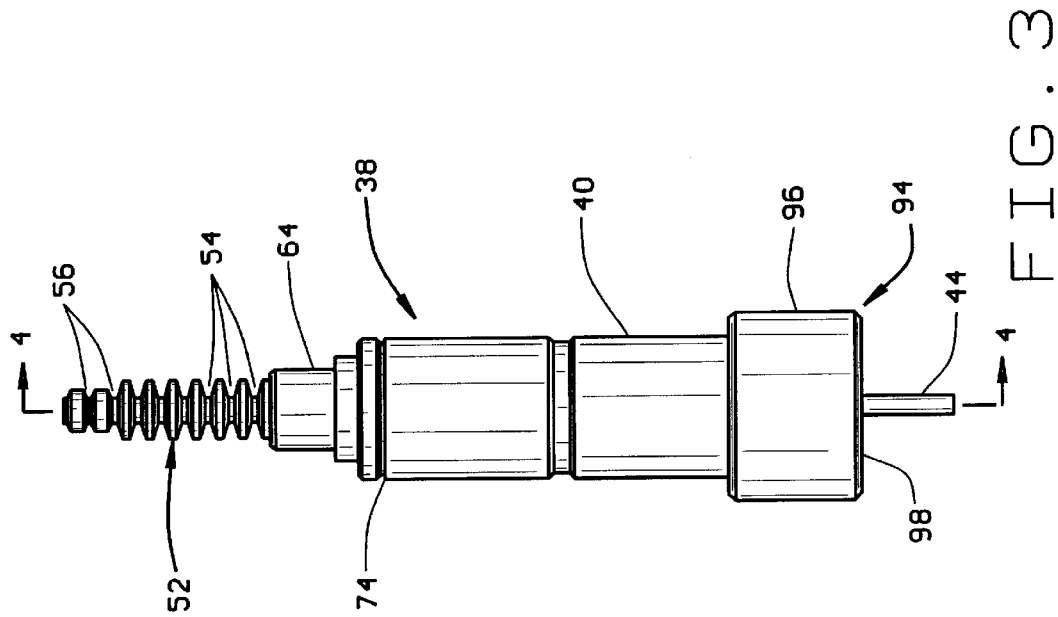
FIG. 3 is an illustration of one embodiment of the measuring gauge of the present invention configured to measure tire tread thickness.

Referring now to FIGS. 3 and 4, the measuring gauge of the present invention for use with alignment system 14 is shown generally at 38. Axially located within the hollow cylindrical housing 40 of measuring gauge 38 is a generally cylindrical plunger shaft 42 comprising three distinct sections. The first section, the plunger tip 44, is of a small diameter and is adapted to extend a predetermined distance beyond the proximal end 45 of the housing 40 for contact with objects undergoing measurement. The second section of plunger shaft 42, the core 46, has a uniform diameter greater than that of the plunger tip 44, and is adapted to fit axially within the housing 40. A circumferential groove 48 located approximately midway along the core 46 provides an attachment point for plunger snap ring 50. The final section of the plunger shaft 42, the insertion tip 52, is slightly larger in diameter than the core 46, and extends beyond the distal end 53 of the housing 40. Insertion tip 52 is adapted for engaging the rotary encoder sensor 36 of the alignment system 14, and incorporates a series of large diameter annular engaging grooves 54a–k and two smaller diameter annular guide grooves 56a–b.

Figure 6:
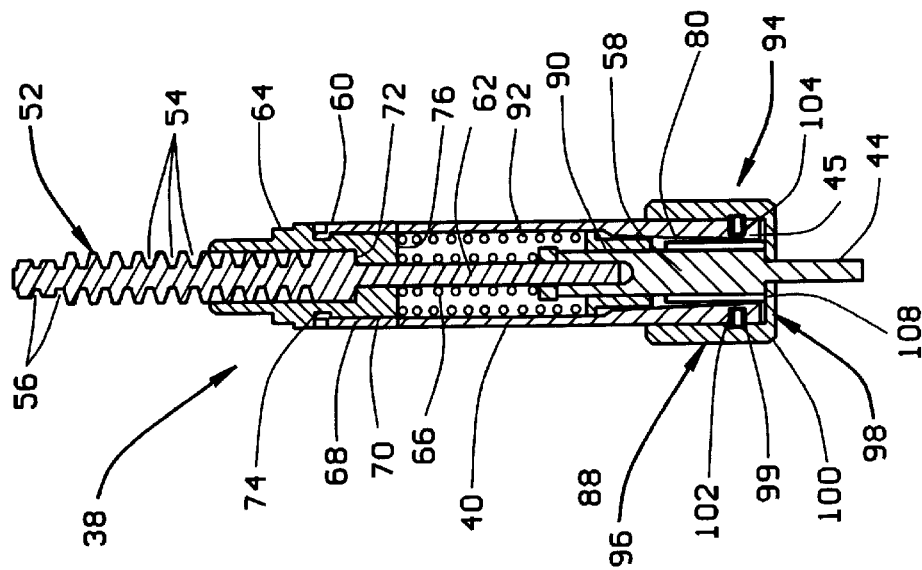
FIG. 6 a view similar to FIG. 4, of the measuring gauge shown in FIG. 5, taken along line 6—6.
Figure 5:
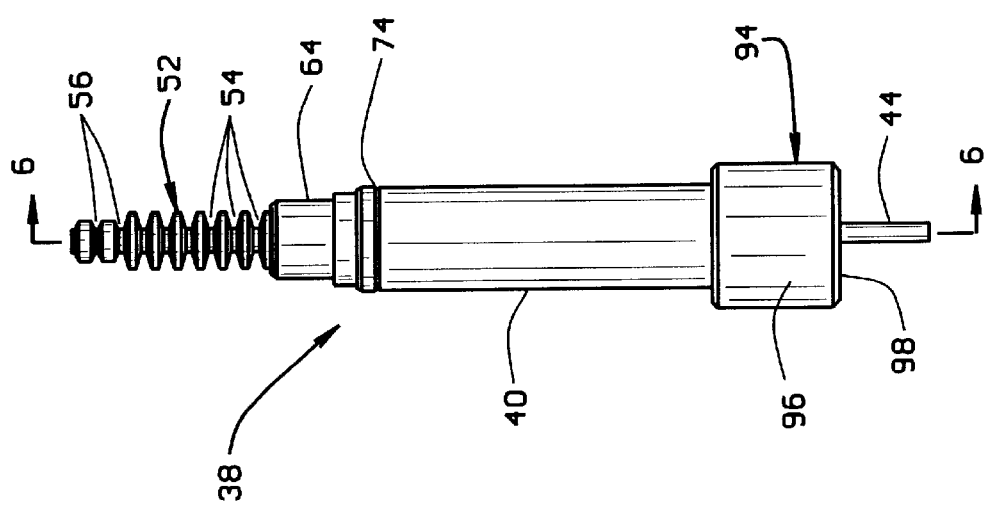
FIG. 5 is an illustration of an alternate embodiment of the measuring gauge shown in FIG. 3.

In an alternate embodiment of the present invention shown in FIG. 6, the plunger shaft 42 comprises two separate elements, a plunger tip shaft 58, and an insertion tip shaft 60 engaging the distal portion of plunger tip shaft 58. The plunger tip 44 is formed as a reduced diameter portion of the plunger tip shaft 58. Correspondingly, the insertion tip shaft 60 comprises a reduced diameter core 62 and a larger diameter insertion tip 52 including annular engaging grooves 54a–k and annular guide grooves 56a–b. The reduced diameter core 62 is of a narrower diameter than the distal portion of plunger tip shaft 58, and interlocks with plunger tip shaft 58 in core opening 63.

Referring generally to FIGS. 4 and 6, plunger shaft 42 is retained within the housing 40 by a neck piece 64 and a compression spring 66. Neck piece 64 is externally threaded 68, and adapted to securely thread into corresponding internally threaded 70 within the distal end of housing 40. Axially hollowed, neck piece 64 contains an annular shoulder or restriction 72 having an inner diameter greater than the diameter of the core 46, but smaller than that of the insertion tip 52. Plunger shaft 42 axially traverses neck piece 64 into housing 40, abutting the restriction 72 with insertion tip 52. Plunger shaft 42 is thereby prevented from passing fully through housing 40 in the proximal direction, and provided with a maximal extension position defined by the point of contact between restriction 72 and insertion tip 52. Similarly, in the alternate embodiment shown in FIG. 6, the reduced diameter core 62 of insertion tip shaft 60 passes axially through neck piece 64 up to the point of engagement with restriction 72.

To prevent the plunger shaft 42 from falling out the distal end 53 of the housing 40, and to provide a spring loading force on the plunger shaft 42, compression spring 66 is fitted internal to housing 40 such that one end is in contact with the neck piece base 76, and the opposite end is in contact with plunger snap ring 50 or the base 77 of the plunger tip shaft 58. As the plunger shaft 42 is displaced in a distal direction, the plunger snap ring 50 or plunger tip shaft base 77 compresses compression spring 66, seated against the neck piece base 76. The opposing spring force from compression spring 66 prevents the plunger shaft 40 from falling out the distal end 53 and provides a spring loading force against which the plunger shaft 40 is depressed.

Once depressed by means of an external force on the plunger tip 44, the plunger shaft 42 is locked at the lowest point of depression by a trio of spring loaded wedge-shaped collets 78a–c circumferentially surrounding the core 46. Collets 78a–c are driven against a decreasing diameter inner surface 80 of the housing 40 by the compressed collet compression spring 82, which in turn is seated against a collet snap ring 86 secured to an annular groove 84 on the inner surface 80. Collet compression spring 82 acts on collets 78a–c to provide a frictional locking force between the core 46 and the inner surface 80, maintaining the plunger shaft 42 in the depressed position until the locking force is released.

In the alternate embodiment shown in FIG. 6, the plunger tip shaft 58 and insertion tip shaft 60 are locked at the lowest point of depression by the frictional force of bearings 88 trapped between the decreasing diameter inner surface 80, the plunger tip shaft 58, and a bearing retaining ring 90 surrounding the distal portion of the plunger tip shaft 58. Bearing compression spring 92, seated against the neckpiece base 76, exerts a force on the bearing retaining ring 90, driving the bearings 88 into the decreasing diameter inner surface 80. The exerted force causing bearings 88 to frictionally lock the plunger tip shaft 58 in its depressed position until the locking force is released.

The release of the locking force is triggered by a slight axial motion of endcap 94. Fitted to surround the proximal portion of housing 40, endcap 94 comprises a circumferential side skirt 96 extending from a disc-shaped contact surface 98. An annular endcap snap-ring groove 99 is formed on the inner surface of the side skirt 96, and receives endcap snap ring 100. A corresponding housing snap-ring groove 102 is formed on the external surface of housing 40, positioned so as to receive endcap snap ring 100 when endcap 94 is positioned slightly away from the proximal end of housing 40. Housing snap-ring groove 102 is formed so as to permit a small degree of axial movement of the endcap snap ring 100, correspondingly permitting a small degree of axial movement of endcap 94 sufficient to permit contact between the underside 104 of contact surface 98 and the proximal end of housing 40.

The contact surface 98 of endcap 94 contains an axially positioned plunger tip opening 105, of sufficient radius to permit the passage of plunger tip 44, but not the larger diameter core 46, or larger diameter portion of plunger tip shaft 58. Accordingly, the contact between the larger diameter core 46 and the underside 104 as seen in FIG. 4, (or between the larger diameter portion of the plunger tip shaft 58 and the underside 104 as seen in FIG. 6) additionally prevents proximal movement of the plunger shaft 42 beyond the full extended position of the plunger tip 44 as defined by the contact between restriction 72 and insertion tip 52 or insertion tip shaft 60.

Additionally, as shown in FIG. 4, contacting the underside 104 are the narrow ends 106a–c of collets 78a–c. When endcap 94 is forcibly displaced in an axial direction such that the underside 104 contacts the proximal end of housing 40, collets 78a–c are driven in a distal direction, releasing any frictional locking force acting on the plunger shaft 42, and compressing the collet compression spring 82. This permits the plunger shaft 42 to return to a fully extended position through the expansion of compression spring 66. Releasing the force on endcap 94 permits the re-expansion of collet compression spring 82, in turn driving collets 78a–c and endcap 94 back to their original positions shown in FIG. 4.

In the alternative embodiment shown in FIG. 6, the underside 104 is in contact with the bearing release bushing 108, a cylindrical piece fitted around the larger diameter portion of plunger tip shaft 58 proximal to the bearings 88. Forcibly displacing endcap 94 in an axial direction displaces the bearing release bushing 108 axially along the plunger tip shaft 58. This displacement drives bearings 88 in a distal direction, displacing the bearing retaining ring 90 and compressing the bearing compression spring 92, simultaneously releasing any frictional locking force and allowing plunger shaft 42 to return to a fully extended position through the expansion of compression spring 66. Releasing the force on endcap 94 permits the re-expansion of bearing compression spring 92, in turn returning the bearing retaining ring 90, bearings 88, and bearing release bushing 108 to their original positions shown in FIG. 6.

During use, measurements obtained with the measuring gauge 38 are determined from the linear displacement of plunger shaft 42 along the axis of housing 40. In one embodiment, measuring gauge 38 is employed to determine the remaining tread depth on automobile tires. Plunger tip 44 is positioned in contact with the bottom of a groove in the tread of a tire (not shown). The housing 40 is then pushed down towards the tire, causing the plunger shaft 42 to be displaced axially relative to the housing 40. This downward movement continues until the contact surface 98 encounters the raised portion of the tire tread. At this point, plunger shaft 42 is automatically locked into position by the action of either the spring loaded collets 78a–c or the bearings 88. A portion of the plunger tip 44 is now within the housing 40, and a corresponding portion of insertion tip 44 extends beyond the distal end of housing 40.

The amount of displacement of the plunger shaft 42 within the housing 40 corresponds directly to the depth of the tire tread. To obtain a numerical value for the displacement, the measuring gauge 38 is placed insertion tip 52 first into a port (not shown) of the alignment system 14 containing the rotary encoding sensor 36. Upon insertion of the measuring gauge 38 into the port, the insertion tip 52 "bottoms out" when the neckpiece 64 engages the peripheral edges of the port, allowing the annular engaging grooves 54a–k to engage the teeth of the rotary encoding sensor 36. Once the measuring gauge 38 is fully inserted within the port, the endcap 94 is forcibly depressed, releasing the frictional locking force holding plunger shaft 42 in a depressed position. The expansion of compression spring 66 forces the plunger shaft 42 to return to the original predetermined fully extended position. As the plunger shaft 42 returns to its original position, the annular engaging grooves 54a–k apply force to the teeth of the rotary encoding sensor 36, causing rotating of the sensor proportional to the distance of axial displacement of the plunger shaft 42. The rotary encoding sensor 36 is connected to the microcomputer 26 in the alignment system 14 which displays and records the resultant measurement.

When mounted within a caliper 110 as shown in FIG. 7, measuring gauge 38 is adapted to measure the thickness of various automotive components, in particular, brake rotors. Caliper 110 is a "C" shaped bracket including a gauge arm 112 and a reference arm 114. Measuring gauge 38 is secured within a mounting hole 116 located on gauge arm 112 such that the plunger tip 44 extends perpendicularly into the interior space of caliper 110 a predetermined distance. On the interior surface of reference arm 114, opposite the plunger tip 44, a raised conical protrusion 118 acts as a zero-distance reference point 120. The distance between the predetermined extension of plunger tip 44 and the zero-distance reference point 120 provides a known distance against which thickness measurements are taken.

To measure the thickness of a brake rotor, caliper 110 and measuring gauge 38 are positioned around the brake rotor such that the zero reference point 120 contacts one surface of the brake rotor. Plunger tip 44 is then axially moved into contact with the opposite brake rotor surface, correspondingly displacing the insertion tip 52 a distance proportional to the thickness of the brake rotor. Once in place against the surface of the rotor, plunger tip 44 is locked in place by means of either the collets 78a–c or bearings 88. The measuring gauge 38 and caliper 110 are removed from the brake rotor, and the insertion tip 52 placed within a port to record the measurement as described above.

What has been described is a measuring gauge 38 adapted for use with an automobile alignment system 14 to measure and record common automotive measurements. The measuring gauge 38 contains a spring loaded plunger shaft 42 protruding from both ends of the measuring gauge housing 40. The measuring gauge 38 is constructed such that the distance which the plunger shaft 42 protrudes from the housing when fully extended is known. To record measurements, one end of the plunger shaft 42 is driven into the housing 40, and the other is proportionally displaced away from the housing 40. The end displaced away from the housing 40 incorporates a series of annular engaging grooves 54, and is adapted for insertion into a sensor or port on the vehicle alignment system 14. Once the plunger shaft 42 is displaced, it is locked in place by a locking means internal to the measuring gauge housing 40, and the measuring gauge 38 is removed from contact with the surface being measured. To record the measurement, the measuring gauge 38 is inserted with the sensor or port, and the plunger shaft 42 allowed to return to the originally fully extended position. The axially displacement of the plunger shaft 42 as it returns to the original position is recorded by the sensor, and translated into a corresponding measurement.

One feature of a measuring gauge 38 of this type adapted for use with a vehicle alignment system is that the measurements made by the measuring gauge at each wheel may be entered directly into the alignment sensor associated with the wheel being measured. This eliminates the need to store a recorded series of measurements which must later be loaded into the alignment system microcomputer 26, and correspondingly eliminates the necessity of tracking which wheel the measurements were taken from.

In addition to measuring tire tread depth and brake rotor thickness as described above, measuring gauge 38 may be configured to record the air pressure of a tire, as illustrated in FIG. 8. Tire pressure gauge 38 is made by removing endcap 94 of the tread depth gauge and replacing it with housing 201 and the associated hardware shown. In this embodiment opening 203 of a chuck 205 in use is placed over a valve stem of a tire, causing air to escape from the tire being measured, which pressurizes the chamber inside of the gauge 38. This increased pressure acts on a seal 207, which in turn acts on a piston 209. Piston 209 exerts a force on the end of spring loaded plunger 44. The displacement of the plunger is a function of the pressure being measured. This displacement is measured in a manner identical to that used when measuring tread depth.

It will be recognized by one skilled in the art that other embodiments of this measuring, gauge concept are possible. The mechanism for measuring the displacement or travel of the plunger shaft does not necessarily need to be the existing ride height measurement scheme described in U.S. Pat. No. 5,369,602, but in the alternative, could be dedicated sensor or receptacles into which the measuring gauge could be inserted. Furthermore, the displacement or travel of the plunger shaft may be measured directly by mechanical, optical, or other means.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

I claim:

1. Apparatus for use in conjunction with an automobile inspection system to measure linear displacement comprising:

a housing;

a member movably mounted axially with respect to said housing, adapted for movement from a measuring position to a rest position, said member having a first end for contacting the surface to be measured when the member is placed in the measuring position, the amount of displacement from the measuring position to the rest position being a function of the distance being measured;

a retaining means internal to said housing adapted to releasably secure said member in the measuring position; and means for determining the distance of axial displacement of said member during movement from the measuring position to the rest position, said distance determining means including means signaling said distance to a sensor.

2. The apparatus of claim 1 wherein said member is spring loaded, returning to said rest position upon the release of said retaining means.

3. The apparatus of claim 1 wherein said distance determining means includes a plurality of annular grooves positioned around a portion of said member extending from said housing, said annular grooves engaging the teeth of a rotary sensor to rotate said rotary sensor during movement of said member.

4. The apparatus of claim 3 wherein the movement of said member returning to the rest position from said measuring position associated with the release of said retaining means is recorded by said sensor, said movement being proportional to the measured linear displacement.

5. Apparatus associated with a vehicle inspecting system for determining a linear displacement relative to a surface comprising:

a housing having a longitudinal axis;

a measuring shaft axially mounted in said housing, said measuring shaft being adapted for linear displacement from a rest position along the axis of said housing, a first end of said measuring shaft being adapted for contacting the surface, and a second end of said measuring shaft being adapted to engage a sensor for measuring linear displacement of said measuring shaft; and locking means releasably holding said measuring shaft within said housing, said locking means being mounted internal to said housing.

6. The apparatus of claim 5 wherein said housing further comprises:

a cylindrical body open at a proximal and distal end, and having an axial passage of non-uniform diameter adapted for receiving said measuring shaft;

a neck piece secured to the distal end of said body, said neckpiece having a restricted shaft opening co-axial with said axial passage, and adapted to engage the peripheral portion of a sensor port; and and endcap movably secured to the proximal end of said body, said endcap axially movable to release said locking means, permitting linear displacement of said measuring shaft.

7. The apparatus of claim 5 wherein said measuring shaft is an integral shaft having a contact tip portion of a first diameter for contacting said surface; a core portion of a second diameter traversing the axis of said housing; and an engaging portion of a third diameter adapted to engage said sensor.

8. The apparatus of claim 7 wherein said first diameter is smaller than said second diameter, and said second diameter is smaller than said third diameter.

9. The apparatus of claim 7 wherein said sensor is a rotary encoding sensor having a plurality of engagement teeth, and said engaging portion includes a plurality of annular grooves adapted to engage the teeth of said rotary encoding sensor.

10. The apparatus of claim 5 wherein said measuring shaft comprises a contact shaft and sensor engaging shaft, said sensor engaging shaft secured to said contact shaft to form the axially continuous measuring shaft.

11. The apparatus of claim 10 wherein said contact shaft is an integral shaft having a contact tip portion of a first diameter for contacting said surface, and an engaging portion of a second, larger diameter, said engaging portion including an engaging means for securing said sensor engaging shaft axially thereto.

12. The apparatus of claim 10 wherein said sensor is a rotary encoding sensor having a plurality of engagement teeth, and said engaging shaft is an integral shaft having a small diameter core portion, and a larger diameter engaging portion, said engaging portion including a plurality of annular grooves adapted to engage the teeth of said rotary encoding sensor.

13. The apparatus of claim 5 wherein said measuring shaft is spring loaded.

14. The apparatus of claim 13 wherein said measuring shaft has a first position corresponding to a rest position, and a second position corresponding to the maximum linear displacement from said first position.

15. The apparatus of claim 14 wherein linear displacement of said measuring shaft from said first position to said second position increases the spring loading force on said measuring shaft.

16. The apparatus of claim 5 wherein said locking means is spring loaded and positioned adjacent a portion of the inner surface of said housing having an axially non-uniform radius, said non-uniform radius smoothly decreasing towards the contact end of said measuring shaft.

17. The apparatus of claim 16 wherein said locking means comprises a plurality of wedge-shaped collets interposed between said axially located measuring shaft and a radially non-uniform inner surface of said housing, said wedge-shaped collets frictionally preventing linear displacement of said measuring shaft.

18. The apparatus of claim 16 wherein the narrow portions of said wedge-shaped collets face the contact end of said measuring shaft.

19. The apparatus of claim 17 wherein said wedge-shaped collets are spring-loaded into forced contact with said measuring shaft and inner surface by the expansion force of a compression spring.

20. The apparatus of claim 19 wherein said locking means is released to permit linear displacement of said measuring shaft by a movable portion of said housing, linear displacement of said movable portion along the axis of said housing linearly displacing said wedge-shaped collets out of contact with said inner surface and compressing said compression spring.

21. The apparatus of claim 16 wherein said locking means comprises a plurality of rolling elements interposed between said axially located measuring shaft, a retaining ring, and a radially non-uniform inner surface of said housing, said rolling elements frictionally prevention linear displacement of said measuring shaft.

22. The apparatus of claim 21 wherein said roller elements are spring-loaded into forced contact with said measuring shaft and inner surface by the expansion force of a compression spring acting on said retaining ring.

23. The apparatus of claim 22 wherein said locking means is released to permit linear displacement of said measuring shaft by a movable portion of said housing, linear displacement of said movable portion along the axis of said housing linearly displacing said roller elements out of contact with said inner surface and compressing said compression spring.

24. The apparatus of claim 23 wherein said movable portion of said housing linear displaces said roller elements by means of a release cylinder concentrically mounted around said measuring shaft in contact with said portion of said housing and said roller elements, linear displacement of said housing directly displacing said release cylinder.

25. The apparatus of claim 5 wherein said surface is a tire tread surface, and said linear displacement is the depth of said tire treads.

26. The apparatus of claim 5 wherein said surface is a brake rotor surface, and said linear displacement is the thickness of said brake rotor.

27. The apparatus of claim 26 further including a caliper mounting bracket adapted to secure said housing and measuring shaft in a fixed position relative to a fixed reference point, providing a known distance against which brake rotor thickness may be measured as said linear displacement.

28. The apparatus of claim 5 wherein said surface corresponds to the internal air pressure of a vehicle tire, and said linear displacement is proportional to the difference between said internal air pressure and the ambient air pressure.

29. Apparatus for use in conjunction with an vehicle inspection system to measure values proportional to linear displacement comprising:

an axially hollow cylindrical gauge body;

a measuring shaft axially traversing said cylindrical gauge body, said measuring shaft having a first end protruding from one end of said cylindrical gauge body for contacting a surface to be measured, and a second end protruding from the opposite end of said cylindrical gauge body, said second end having measuring means signaling linear displacement of said measuring shaft within said cylindrical gauge body;

a spring axially mounted within said cylindrical gauge body, said spring contacting said measuring shaft to exert an expansion force on said measuring shaft; and a releasable spring-loaded locking means internal to said cylindrical gauge body for securing said measuring shaft against linear displacement relative to said cylindrical gauge body after a measurement is taken.

* * * * *